US012679152B2

(12) United States Patent
Thibodeaux

(10) Patent No.: US 12,679,152 B2
(45) Date of Patent: Jul. 14, 2026

(54) MOBILITY SCOOTER TOW ARRANGEMENT

(71) Applicant: Wayne Thibodeaux, Hesperia, CA (US)

(72) Inventor: Wayne Thibodeaux, Hesperia, CA (US)

( * ) Notice: Subject to any disclaimer, the term of this patent is extended or adjusted under 35 U.S.C. 154(b) by 375 days.

(21) Appl. No.: 18/428,875

(22) Filed: Jan. 31, 2024

(65) Prior Publication Data

US 2025/0242643 A1    Jul. 31, 2025

(51) Int. Cl.
| | |
|---|---|
| *B60D 1/28* | (2006.01) |
| *B60D 1/02* | (2006.01) |
| *B60D 1/145* | (2006.01) |
| *B60D 1/52* | (2006.01) |
| *B60D 1/00* | (2006.01) |

(52) U.S. Cl.
CPC .............. B60D 1/28 (2013.01); B60D 1/02 (2013.01); B60D 1/145 (2013.01); B60D 1/52 (2013.01); *B60D 2001/005* (2013.01)

(58) Field of Classification Search
CPC . B60D 1/28; B60D 1/02; B60D 1/145; B60D 2001/005; B60D 1/52; B60D 1/1675; B62B 5/002; B62B 5/0079; A61G 5/04
USPC ......... 280/482, 491.2, 491.5, 492, 494, 498, 280/493, 33.991, 33.993, 33.992
See application file for complete search history.

(56) References Cited

U.S. PATENT DOCUMENTS

| | | | |
|---|---|---|---|
| D327,464 S | 6/1992 | Mukics | |
| 5,769,440 A | 6/1998 | Jones | |

| | | | | |
|---|---|---|---|---|
| 6,702,313 B2 * | 3/2004 | Forshee | .................. | B62B 5/002 |
| | | | | 280/33.992 |
| 8,573,625 B2 | 11/2013 | Gramme | | |
| 8,870,209 B2 * | 10/2014 | Conrad | .................. | B60D 1/167 |
| | | | | 280/33.996 |
| 9,308,790 B1 * | 4/2016 | Sharp | ..................... | B60D 1/167 |
| 10,183,719 B2 | 1/2019 | McManus | | |
| 11,383,565 B1 * | 7/2022 | Bruno | ..................... | B62B 5/002 |
| 2012/0248720 A1 | 10/2012 | Grato | | |
| 2013/0307234 A1 | 11/2013 | Anders | | |
| 2013/0333961 A1 * | 12/2013 | O'Donnell | ............ | B62B 5/0033 |
| | | | | 180/65.1 |
| 2015/0360708 A1 * | 12/2015 | Benton | ................. | B62B 5/0033 |
| | | | | 180/14.1 |
| 2016/0194018 A1 * | 7/2016 | Falcaro | .................. | B62B 5/067 |
| | | | | 280/47.3 |
| 2017/0341698 A1 * | 11/2017 | McManus | ............ | B62K 27/003 |

(Continued)

FOREIGN PATENT DOCUMENTS

| | | | | |
|---|---|---|---|---|
| AU | 2003100514 | | 10/2003 | |
| KR | 20240151503 A | * | 10/2024 | ............... B62B 3/14 |

*Primary Examiner* — John Olszewski
*Assistant Examiner* — Matthew D Lee

(57) ABSTRACT

A mobility scooter tow arrangement generally includes a horizontal member, a locking arrangement, and a vertical member. The locking arrangement detachably connects a first end portion of the horizontal member to the rear of a mobility scooter. The vertical member is attached to a second end portion of the horizontal member and positioned to project upwardly and transverse to the horizontal member. The vertical member is designed to be positioned to project into and through an opening in the bottom of a cage basket of a retail shopping cart to permit a user to tow the retail shopping cart from the front with a mobility scooter.

15 Claims, 16 Drawing Sheets

(56) References Cited

U.S. PATENT DOCUMENTS

| | | | |
|---|---|---|---|
| 2020/0246206 A1* | 8/2020 | Carr | B62B 3/02 |
| 2021/0103284 A1* | 4/2021 | Nagata | G05D 1/0225 |
| 2022/0348048 A1* | 11/2022 | Bruno | B60D 1/54 |

* cited by examiner

MOBILITY SCOOTER TOW ARRANGEMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mobility scooter accessories and more particularly pertains to a new mobility scooter tow arrangement for towing a retail shopping cart.

(2) Description of Related Art Including Information Disclosed Under 37 CFR 1.97 and 1.98

The prior art relates to mobility scooter accessories, including towing arrangements to permit a user to tow other wheeled objects, such as trailers, vehicles, and shopping carts using the mobility scooter. The prior art, as best understood, does not disclose a towing arrangement with a vertical tow hitch designed to engage the cage basket of a retail shopping cart.

BRIEF SUMMARY OF THE INVENTION

An embodiment of the disclosure meets the needs presented above in a mobility scooter tow arrangement generally comprising a horizontal member, a locking arrangement, and a vertical member. The locking arrangement is designed to detachably connect a first end portion of the horizontal member to the rear of a mobility scooter such that the horizontal member projects in a fixed essentially horizontal position from the rear of the mobility scooter. The vertical member is attached to a second end portion of the horizontal member and positioned to project upwardly and transverse to the horizontal member. The vertical member is designed to be positioned to project into and through an opening in the bottom of a cage basket of a retail shopping cart to permit a user to tow the retail shopping cart from the front with a mobility scooter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

Figure 9:
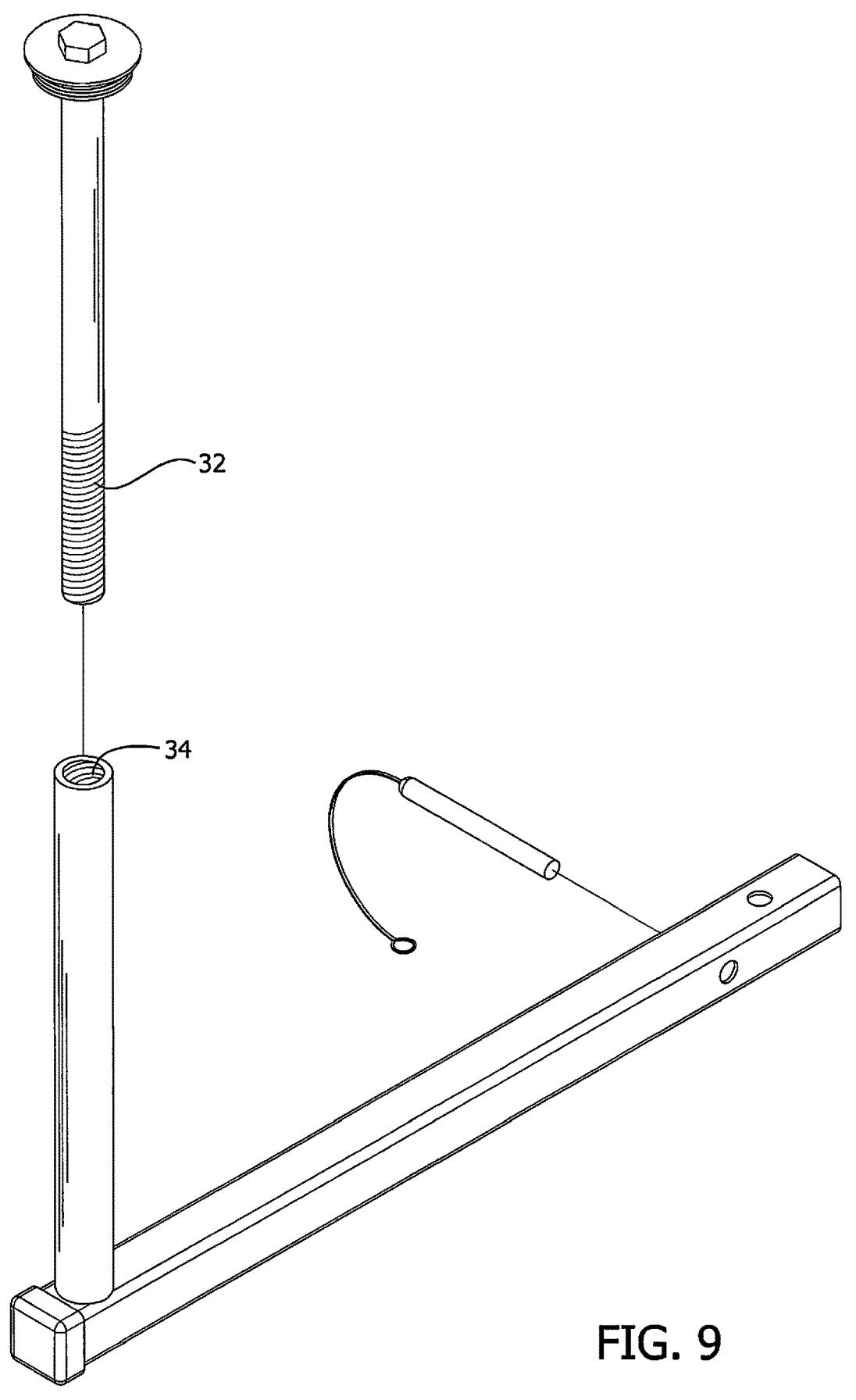

FIG. 9 is a perspective view of an embodiment of the disclosure.

DETAILED DESCRIPTION OF THE INVENTION

Figure 1:
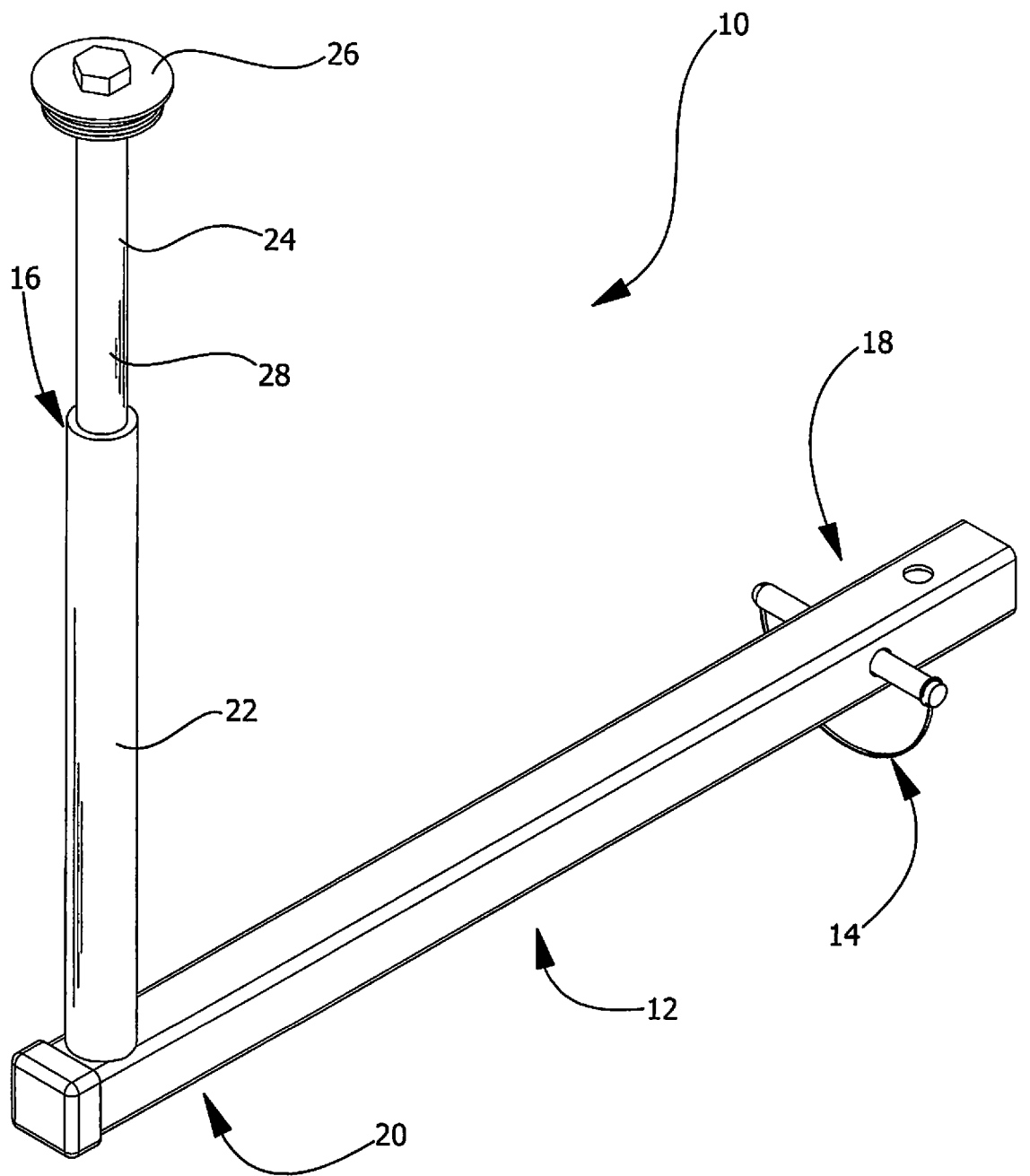
FIG. 1 is a perspective view of a mobility scooter tow arrangement according to an embodiment of the disclosure.
Figure 2:
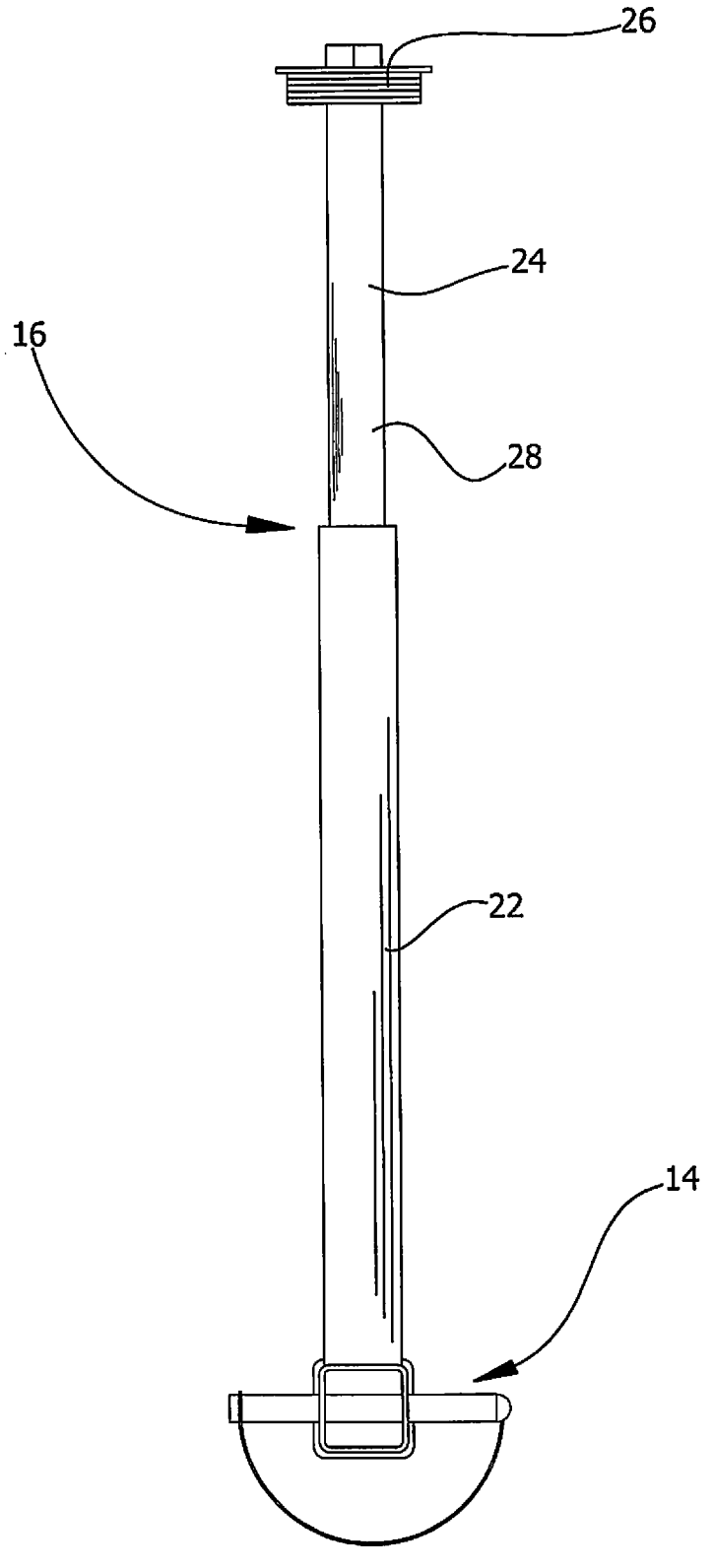
FIG. 2 is a front view of an embodiment of the disclosure.
Figure 3:
FIG. 3 is a close-up view of a portion of an embodiment of the disclosure.
Figure 4:
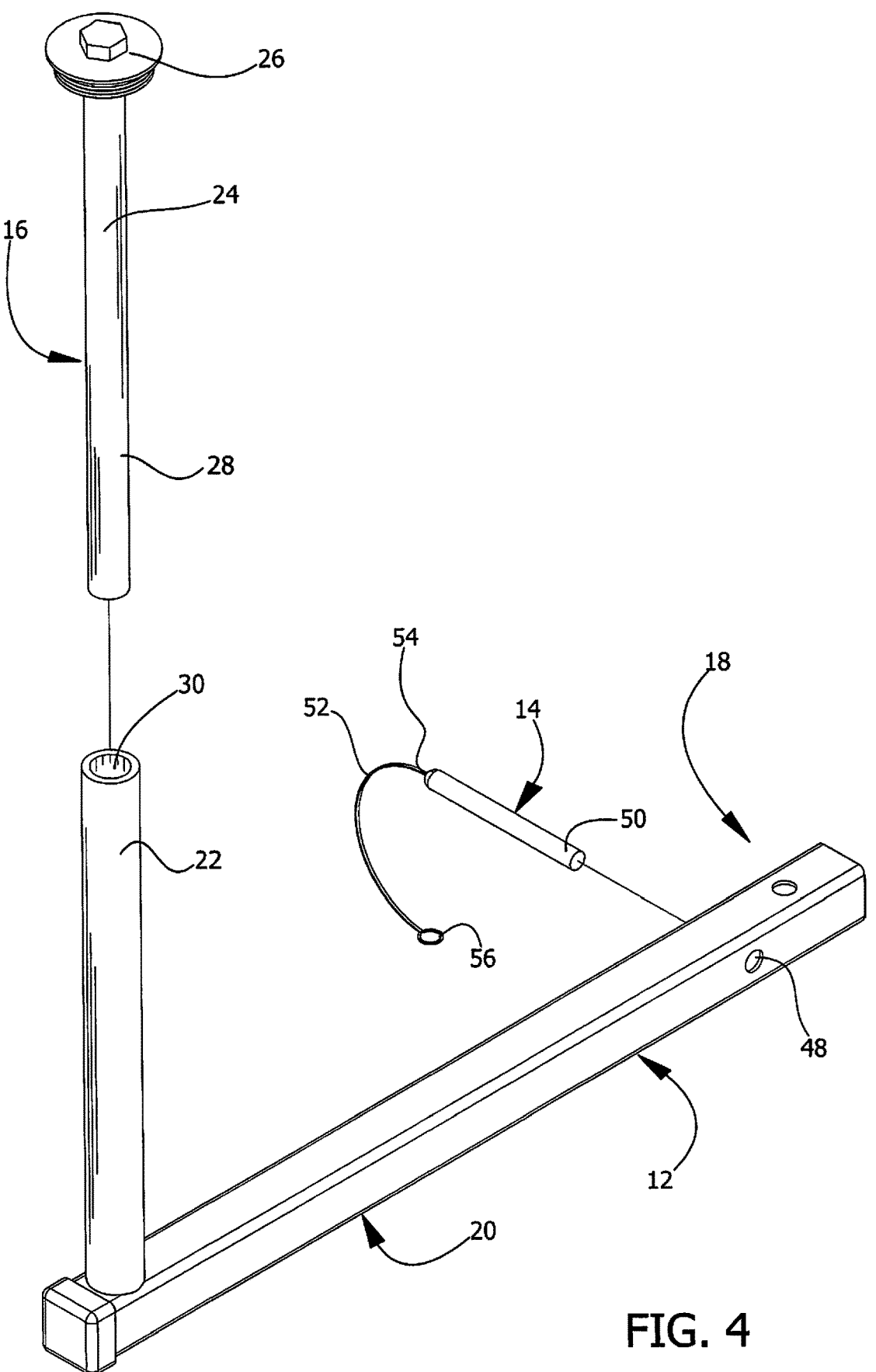
FIG. 4 is an exploded perspective view of an embodiment of the disclosure.
Figure 5:
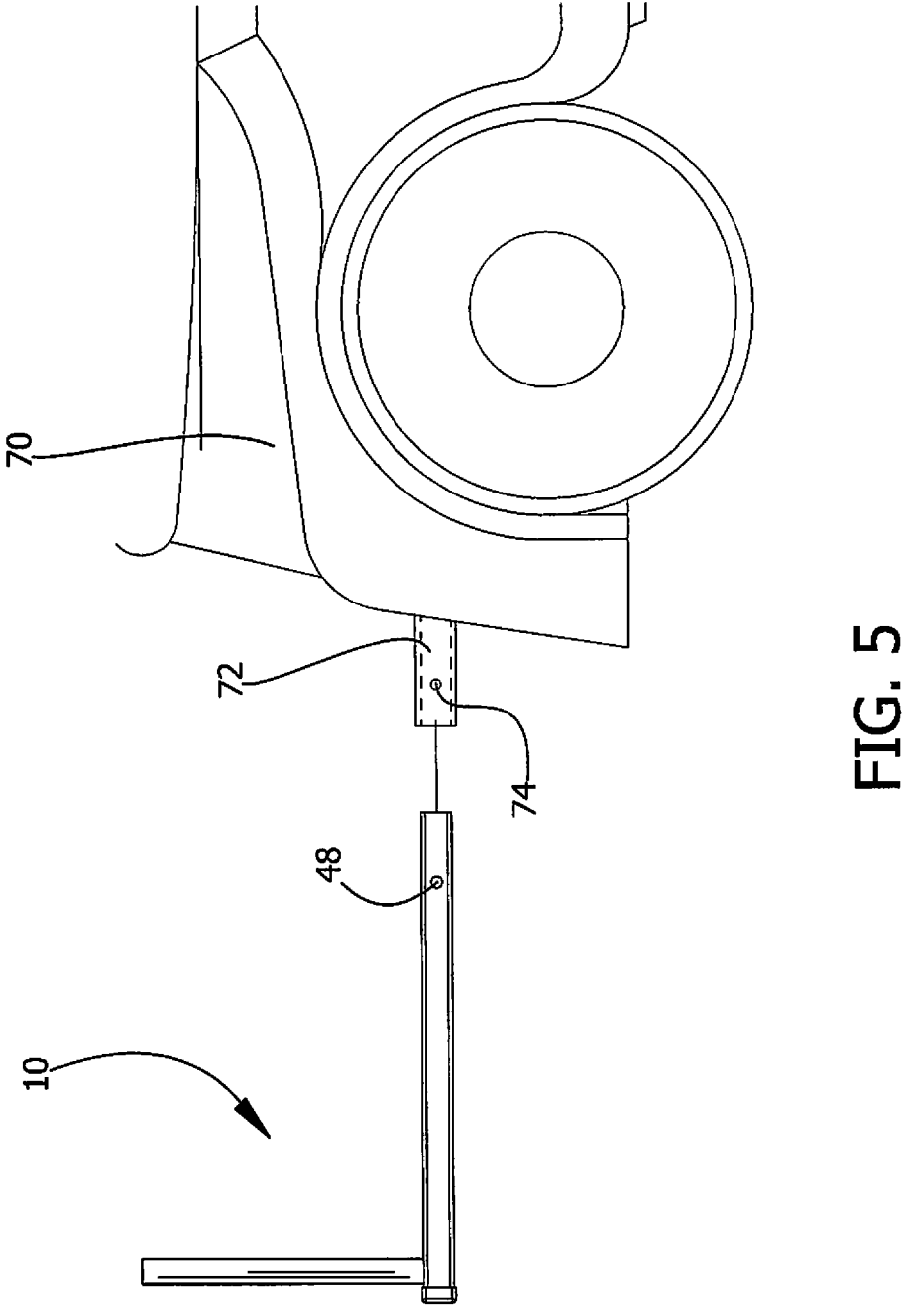
FIG. 5 is a side view of an embodiment of the disclosure.
Figure 6:
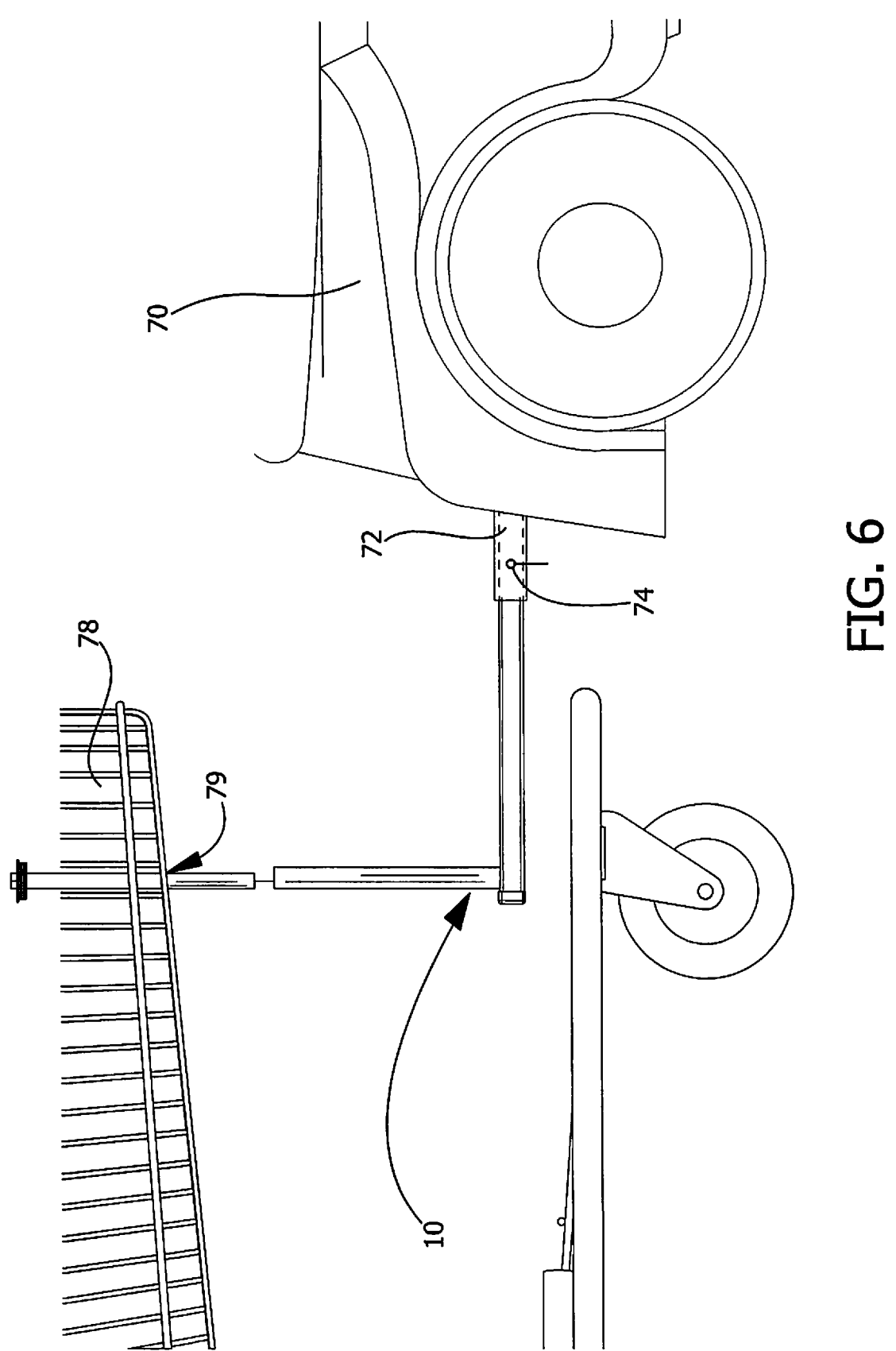
FIG. 6 is a side view of an embodiment of the disclosure.

With reference now to the drawings, and in particular to FIGS. 1 through 15 thereof, a new mobility scooter tow arrangement embodying the principles and concepts of an embodiment of the disclosure and generally designated by the reference numeral 10 will be described.

As best illustrated in FIGS. 1 through 15, the mobility scooter tow arrangement 10 generally includes a horizontal member 12, a locking arrangement 14, and a vertical member 16. The locking arrangement 14 is designed to detachably connect a first end portion 18 of the horizontal member 12 to the rear of a mobility scooter 70 (see FIG. 5) such that the horizontal member 12 projects in a fixed essentially horizontal position from the rear of the mobility scooter 70 (see FIG. 6). The vertical member 16 is attached to a second end portion 20 of the horizontal member 12 and positioned to project upwardly and transverse to the horizontal member 12. The vertical member 16 is designed to be positioned to project into and through an opening 79 in the bottom of a cage basket 78 of a retail shopping cart 76 to permit a user to tow the retail shopping cart 76 from the front with the mobility scooter 70. In use, the user can choose any opening 79 in the cage basket 78 to position the vertical member 16.

In accordance with at least one possible embodiment, the vertical member 16 includes a base portion 22 and a securing portion 24 designed to be detachably connected to the base portion 22. The base portion 22 is attached to the second end portion 20 of the horizontal member 12 in a fixed vertical position. The base portion 22 is designed to be positioned below the opening 79 in the bottom of the cage basket 78 of the retail shopping cart 76. The securing portion 24 is designed to be inserted through the opening 79 in the bottom of the cage basket 78 of the retail shopping cart 76 and detachably connected to the base portion 22. The securing portion 24 is sufficiently long such that the securing portion 24 is positioned to project through the opening 79 in the bottom of the cage basket 78 of the retail shopping cart 76 and into the cage basket 78 upon connection to the base portion 22.

In accordance with at least one possible embodiment, the securing portion 24 includes a rod 28. The base portion 22 includes a receptacle 30 designed to receive a portion of the rod 28 therein to detachably connect the securing portion 24 to the base portion 22.

In accordance with at least one possible embodiment, the securing portion 24 of the vertical member 16 includes a securing flange 26 of a diameter sufficient to prevent passage of the securing flange 26 through the opening 79 in the bottom of the cage basket 78 of the retail shopping cart 76 and thus and thereby automatically adjust the height of said vertical member 16. To further explain, the rod 28 can be dropped into the receptacle 30 and be seated there by gravity at a set height when the bottom of the rod 28 hits the bottom interior surface of the receptacle 30. However, not all retail shopping carts 76 are the same height, and some cage baskets 78 are higher than the set height. In such a case, when the rod 28 is dropped through the cage basket 78, the securing flange 26 rests against the cage basket 78, yet the lower portion of the rod 28 is still seated in the receptacle 30. In addition, since the rod 28 is in place due to gravity, if the retail shopping cart 76 hits bumps or uneven surfaces during towing, the rod 28 will be able to freely be moved up and down to compensate for such up and down motion of the retail shopping cart 76.

The rod 28 could also be seated in a fixed manner rather than only by gravity. In accordance with at least one possible embodiment shown in FIG. 9, the rod 28 includes a male-threaded portion 32 designed to screw into a female-threaded portion 34 of the receptacle 30 to detachably connect the securing portion 24 to the base portion 22. In accordance with at least one possible embodiment shown in FIG. 10, the rod 28 includes a depressible projection 36 and the receptacle 30 includes a plurality of locking holes 38 into which the depressible projection 36 can project to adjustably and detachably connect the securing portion 24 to the base portion 22. In accordance with at least one possible embodiment shown in FIG. 11, the rod 28 includes a rod passage 40, the receptacle 30 includes a pair of receptacle apertures 42 to be aligned with the rod passage 40, and the tow arrangement 10 further includes a locking pin 44 designed to be inserted through the receptacle apertures 42 and the rod passage 40 to detachably connect the securing portion 24 to the base portion 22.

In accordance with at least one possible embodiment, the horizontal member 12 is in the form of a bar designed to be slid into or onto a tow hitch 72 projecting from a lower rear portion of the mobility scooter 70. The horizontal member 12 includes a pair of bar apertures 48 designed to be aligned with a hitch passage 74 in the tow hitch 72. The locking arrangement 14 includes a tow pin 50 and a semi-rigid locking structure 52 that includes a first end 54 affixed to one end of the tow pin 50 and a free second end 56. The tow pin 50 is designed to be inserted through the bar apertures 48 and the hitch passage 74 to detachably connect the horizontal member 12 to the tow hitch 72. The free second end 56 is designed to be detachably connected to an opposite end of the tow pin 50 to prevent inadvertent or unintentional displacement of the tow pin 50 out of the horizontal member 12 and the tow hitch 72.

In accordance with at least one possible embodiment of the horizontal member 12 and the vertical member 16 disclosed in FIGS. 12-15, the horizontal member 12 includes a pivot arrangement 58 to pivotably connect the second end portion 20 to the first end portion 18 to permit downward pivoting of the second end portion 20 from an aligned position aligned with the first end portion 18 to an angled position at an acute angle with respect to the first end portion 18. The pivot arrangement 58 is designed to permit a user to pivot the second end portion 20 and the vertical member 16 attached thereto downwardly from an aligned position such that a top end of the vertical member 16 is positioned below the bottom of the cage basket 78 of the retail shopping cart 76. The pivot arrangement 58 is designed to permit a user to pivot the second end portion 20 and the vertical member 16 attached thereto upwardly from an angled position such that the top end of the vertical member 16 is inserted through the opening 79 in the bottom of the cage basket 78 of the retail shopping cart 76.

In accordance with at least one possible embodiment, a handle 60 is positioned on the second end portion 20 of the horizontal member 12 and designed to permit a user to grasp and pivot the second end portion 20. The handle 60 may be angled at an acute angle with respect to the second end portion 20, such as an angle of about 45 degrees. In accordance with at least one possible embodiment, the pivot arrangement 58 includes a spring-loaded pull pin 62 mounted in the first end portion 18 and designed to project into the second end portion 20 to releasably lock the second end portion 20 in the aligned position.

At this point it should be noted that the figures disclose examples of different types of connecting arrangements and structures, such as pins and screws, to connect different sections of the mobility scooter tow arrangement 10, either in a fixed or detachable manner. It should be understood that any of the disclosed connection designs, as well as any known substitutes or equivalents, can be used to connect any of the different sections of the mobility scooter tow arrangement 10.

In order to tow the retail shopping cart 76 using the mobility scooter tow arrangement 10, a user can first detachably connect the first end portion 18 of the horizontal member 12 to the rear of the mobility scooter 70 with the locking arrangement 14 such that the horizontal member 12 projects in a fixed essentially horizontal position from the rear of the mobility scooter 70. The user then positions the vertical member 16 to project into and through the opening 79 in the bottom of the cage basket 78 of the retail shopping cart 76. The user can then operate the mobility scooter 70 and tow the retail shopping cart 76 from the front, much like how a truck tows a trailer.

For the embodiment of the horizontal member 12 and the vertical member 16 disclosed in FIGS. 1-11, the user first positions the base portion 22 below the opening 79 in the bottom of the cage basket 78 of the retail shopping cart 76. The user then inserts the securing portion 24 downwardly through the opening 79 in the bottom of the cage basket 78 of the retail shopping cart 76 and detachably connects the securing portion 24 to the base portion 22 such that the securing portion 24 is positioned to project through the opening 79 and into the cage basket 78. In accordance with at least one possible embodiment, for retail shopping carts 76 with very low cage baskets 78, the user may need to slightly lift the retail shopping cart 76 over the base portion 22 such that the base portion 22 projects through one of the openings 79.

For the embodiment of the horizontal member 12 and the vertical member 16 disclosed in FIGS. 12-15, the user downwardly pivots the second end portion 20 from an aligned position aligned with the first end portion 18 to an angled position at an acute angle with respect to the first end portion 18 such that a top end of the vertical member 16 is positioned below the bottom of the cage basket 78 of the retail shopping cart 76. The user then upwardly pivots the second end portion 20 from the angled position to the aligned position such that the top end of the vertical member 16 is inserted through the opening 79 in the bottom of the cage basket 78 of the retail shopping cart 76.

Figure 16:
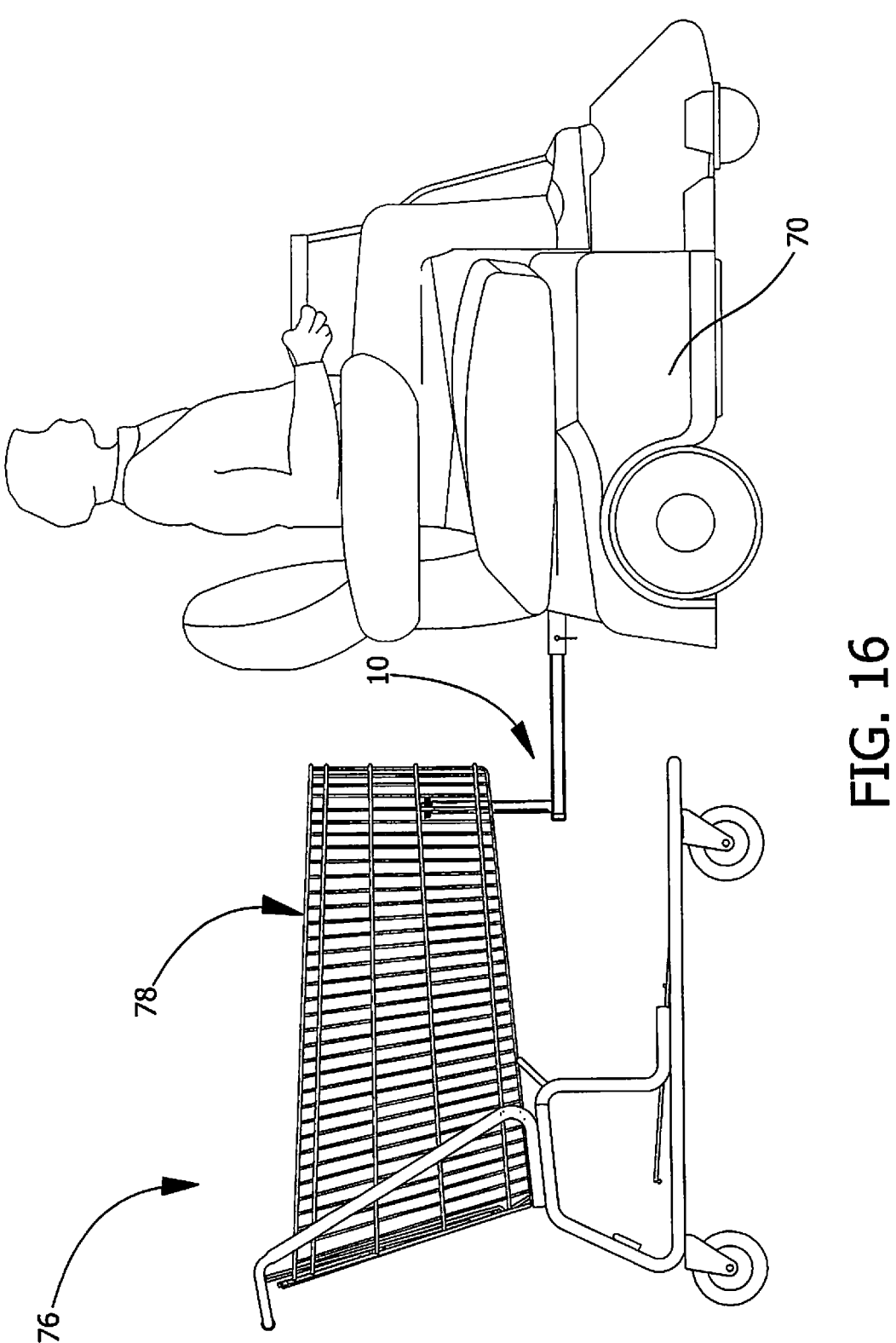
FIG. 16 is a side view of an embodiment of the disclosure.

FIG. 16 shows an alternative positioning of the mobility scooter tow arrangement 10 in which it is positioned higher on the scooter 70. This positioning could be used with the pivoting design of FIGS. 12-15 or the fixed design of FIGS. 1-4. For the fixed design, in order to position the base portion 22 in the opening 79 in the bottom of the cage basket 78 of the retail shopping cart 76, the cage basket 78 would have to be lifted slightly and then dropped down over the base portion 22. The rod 28 is then inserted into the base portion 22.

Figure 7:
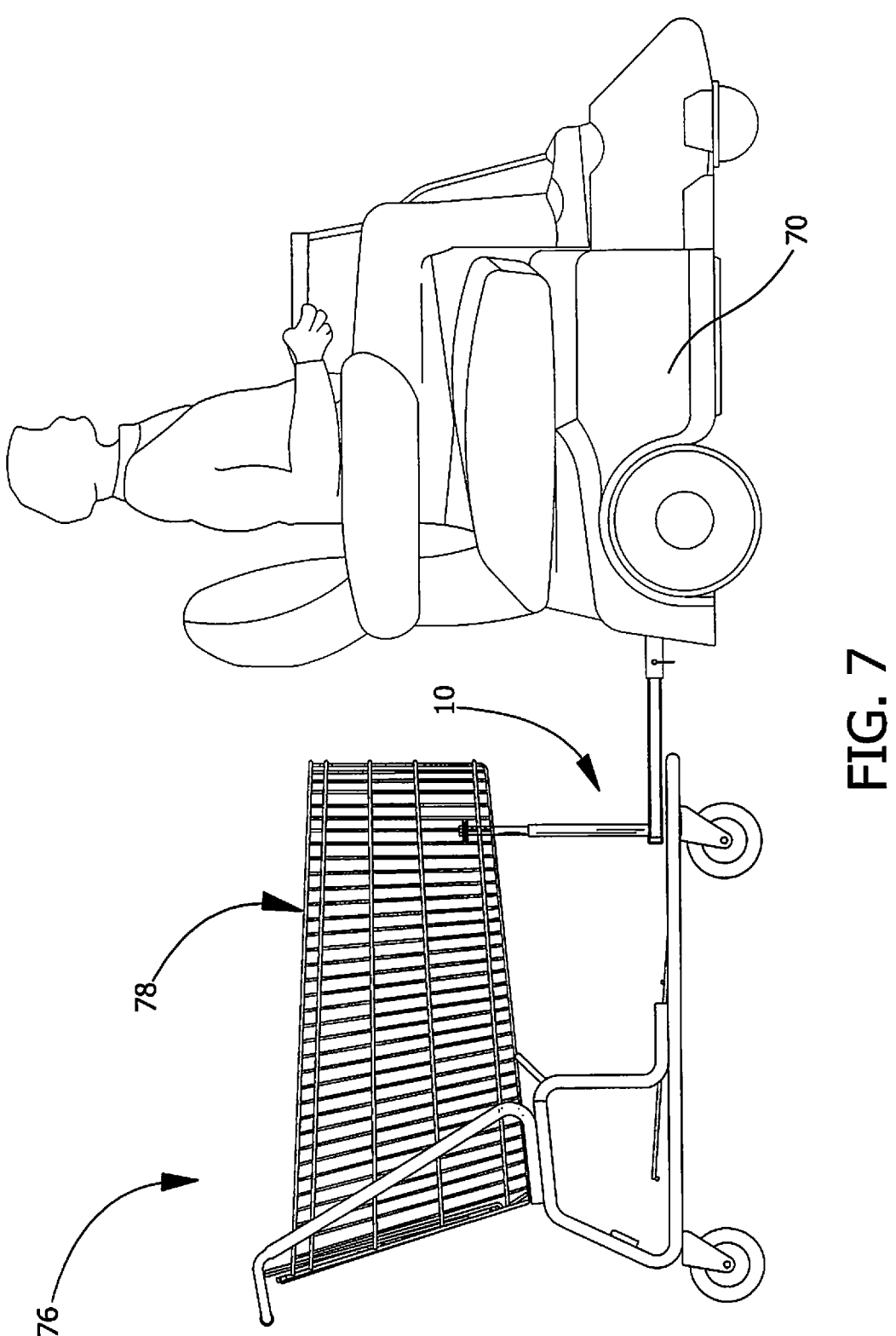
FIG. 7 is a side view of an embodiment of the disclosure.
Figure 8:
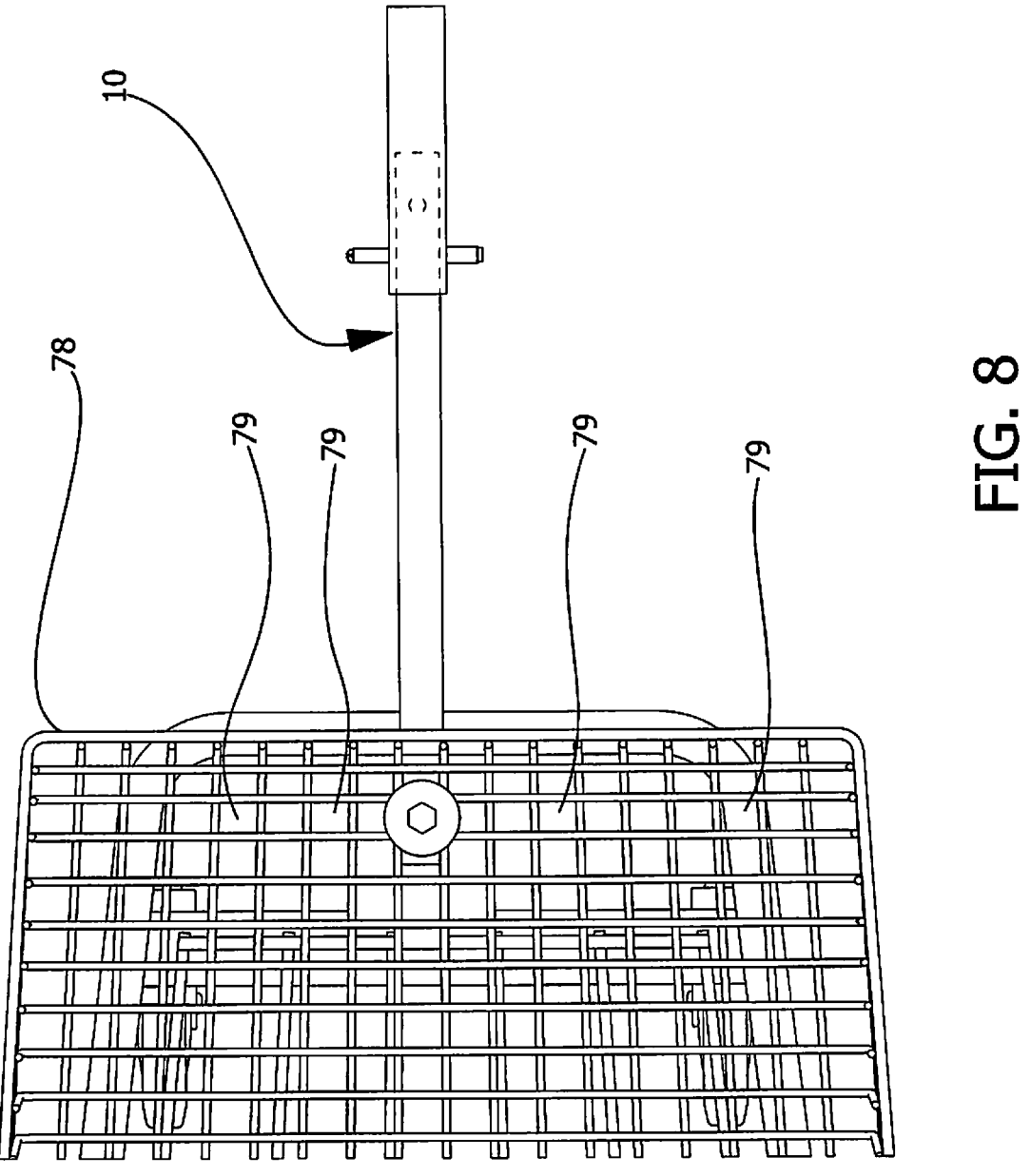
FIG. 8 is a top view of an embodiment of the disclosure.
Figure 10:
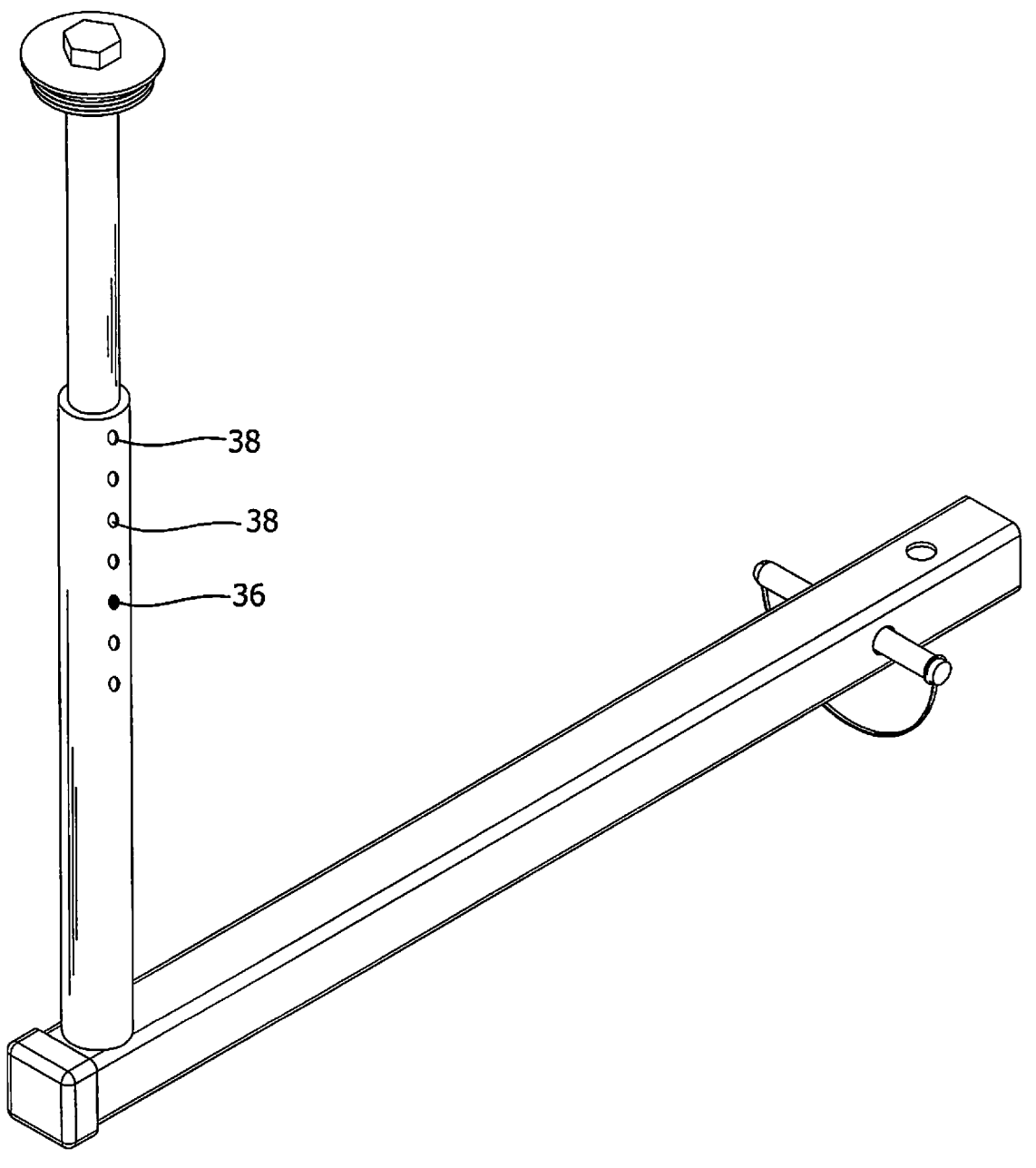
FIG. 10 is a perspective view of an embodiment of the disclosure.
Figure 11:
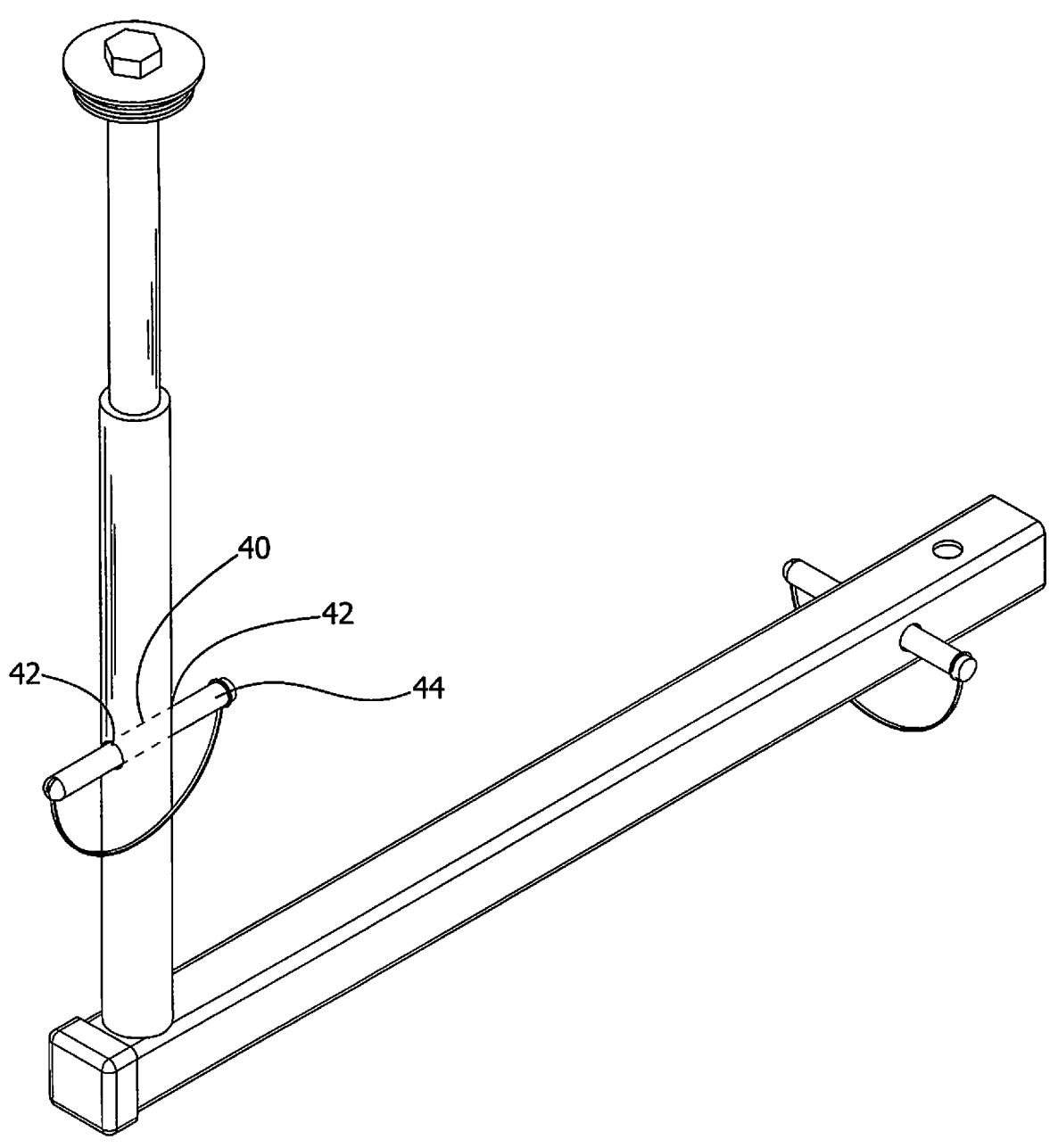
FIG. 11 is a perspective view of an embodiment of the disclosure.
Figure 12:
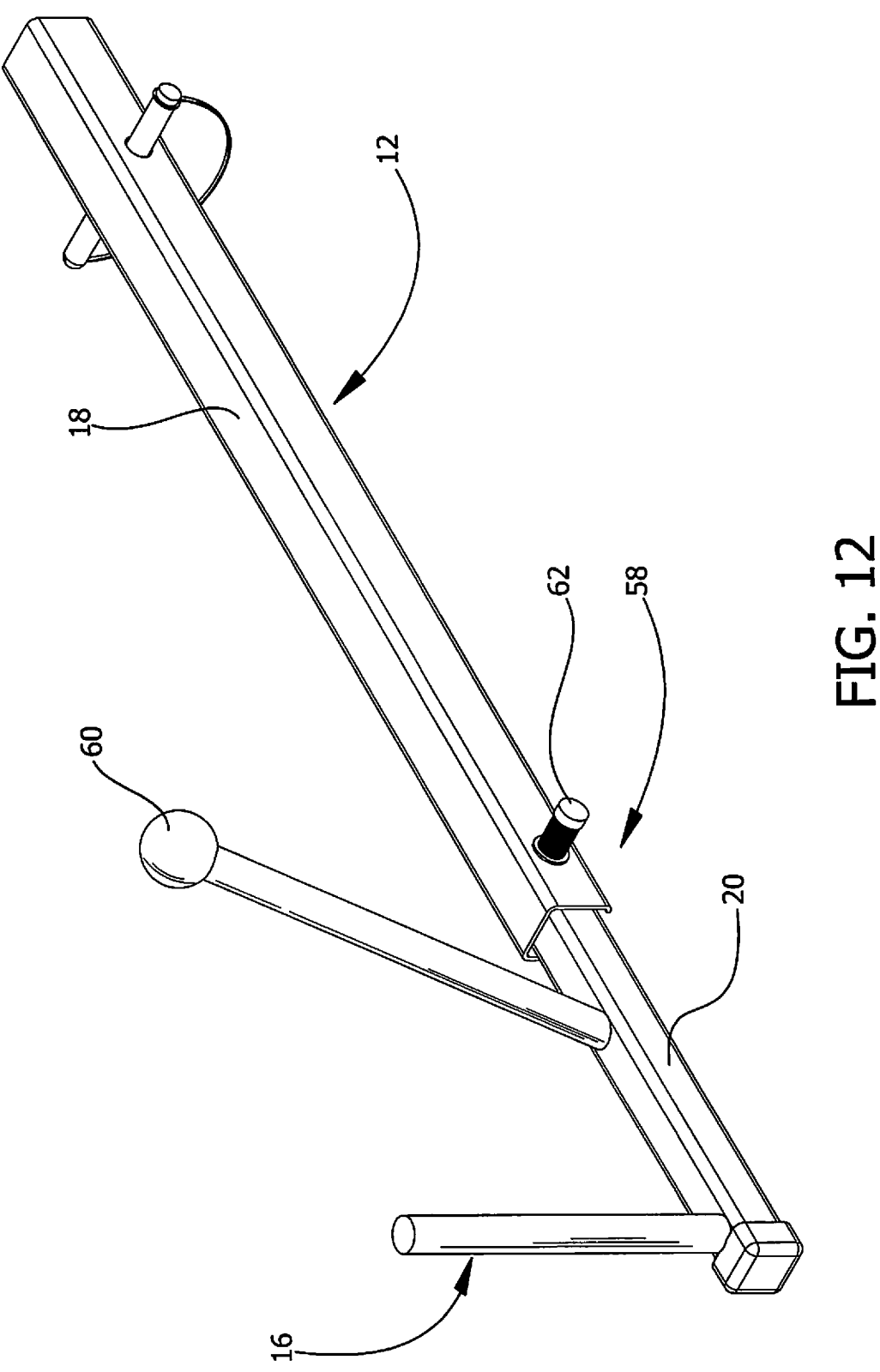
FIG. 12 is a top perspective view of another embodiment of the disclosure.
Figure 13:
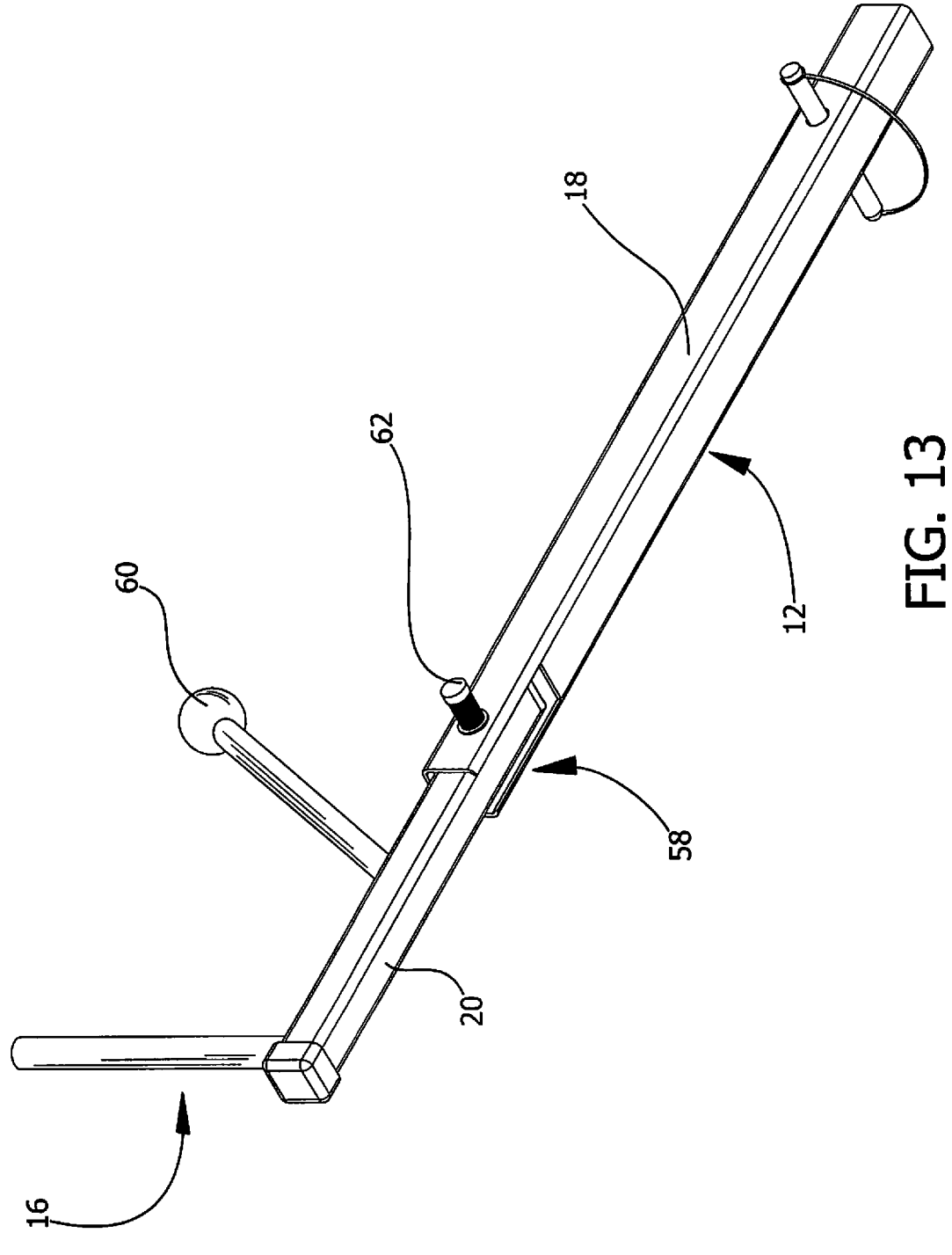
FIG. 13 is a bottom perspective view of the embodiment of the disclosure of FIG. 12.
Figure 14:
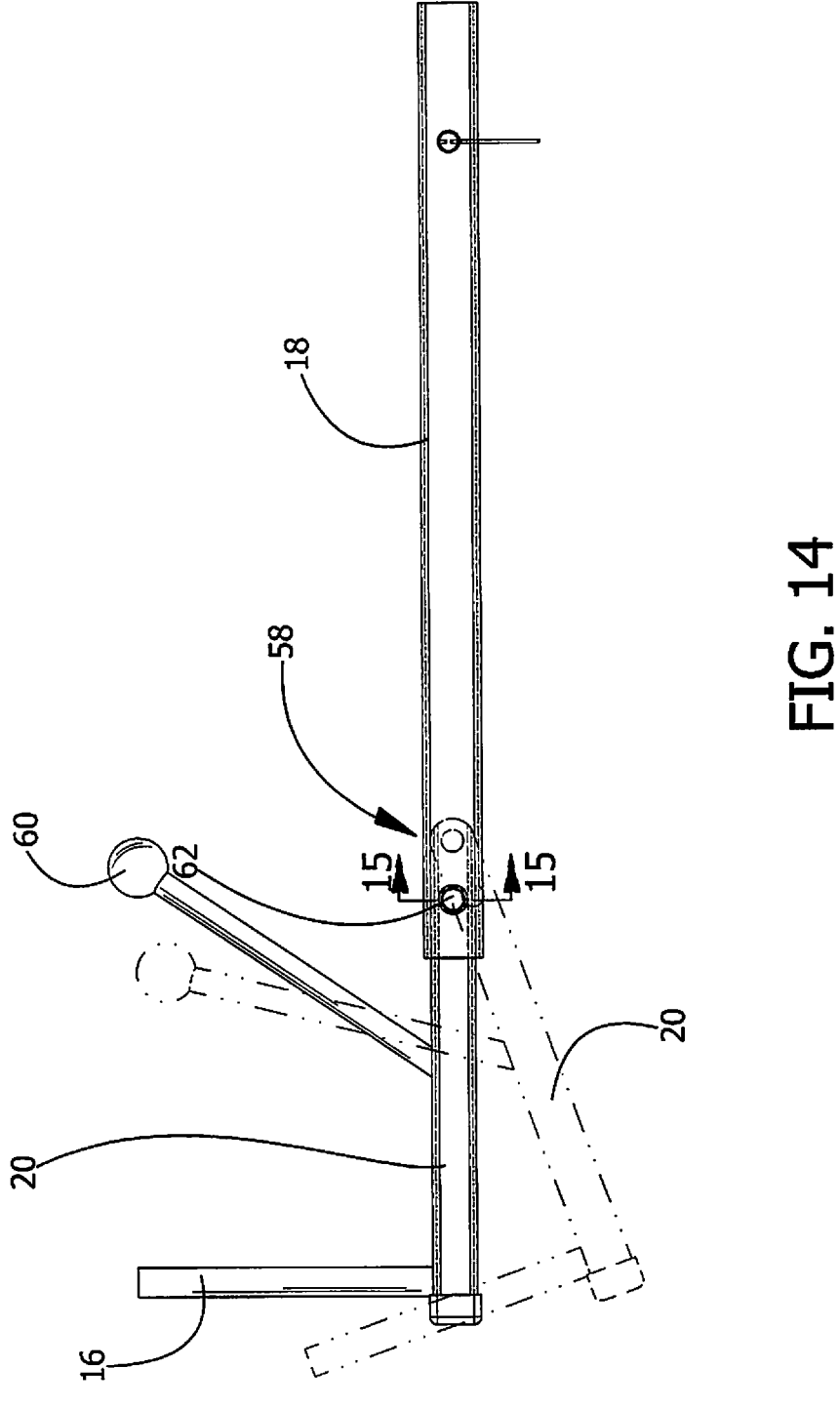
FIG. 14 is a side view of the embodiment of the disclosure of FIG. 12.
Figure 15:
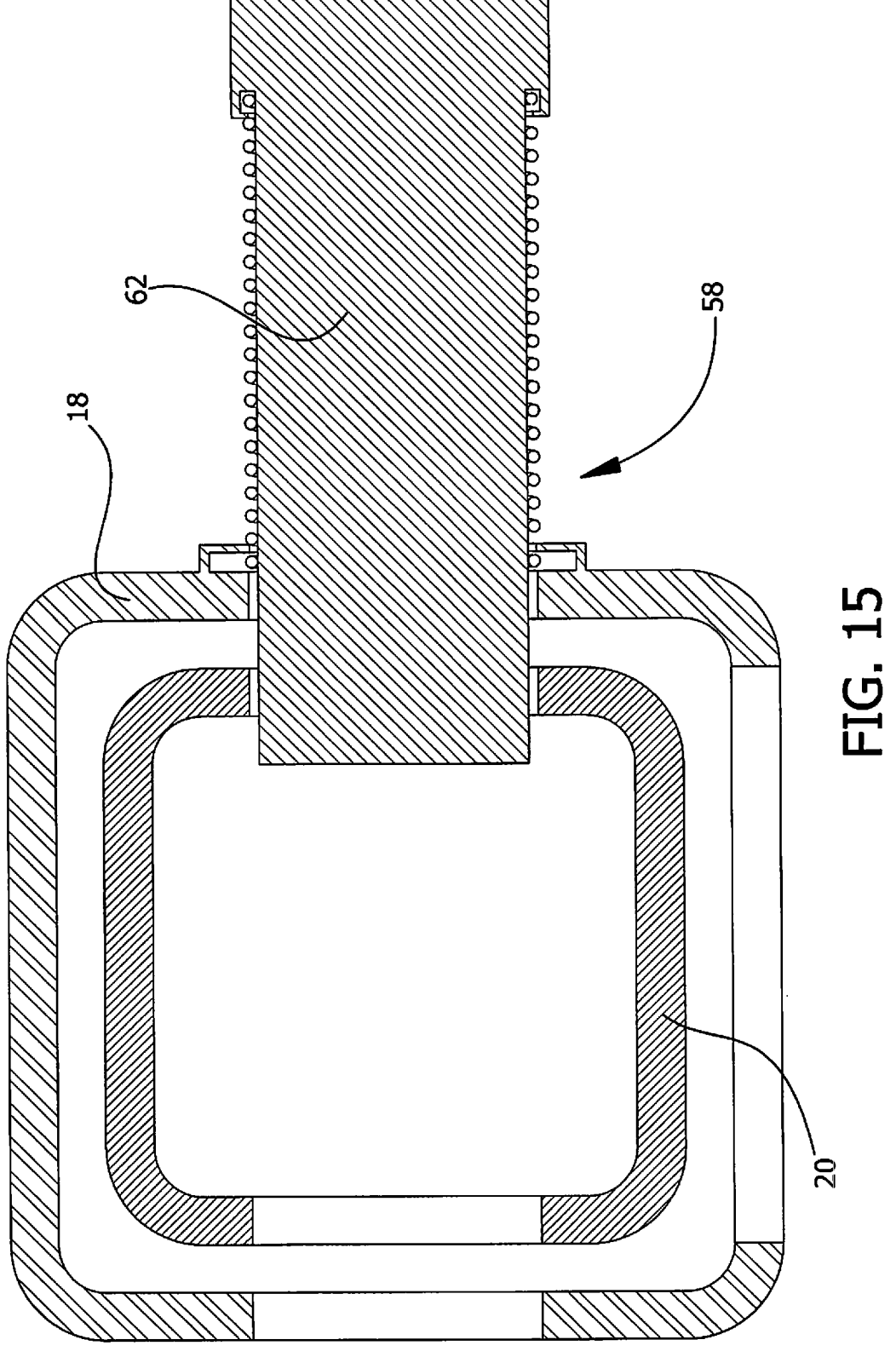
FIG. 15 is a cross-sectional view of a portion of the embodiment of the disclosure of FIG. 12.

It should be noted that the mobility scooter tow arrangement 10 could be connected to a retail shopping cart 76 via any of the openings 79 in the cage basket 78, as shown by the different insertion positions in FIGS. 7 and 8. However, in accordance with at least one possible embodiment, the user should utilize one of the openings 79 that is at or nearest or quite close to the front end of the cage basket 78, such as is shown in FIG. 8. This positioning maximizes the distance between the back of the mobility scooter 70 and the retail shopping cart 76 to minimize or avoid the likelihood that the retail shopping cart 76 will impact and possibly damage the mobility scooter 70 or parts or accessories thereof, especially when making turns while driving the mobility scooter 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mobility scooter tow arrangement for towing a retail shopping cart comprising:

a horizontal member being elongated;

a locking arrangement configured to detachably connect a first end portion of said horizontal member to the rear of a mobility scooter such that said horizontal member projects in a fixed essentially horizontal position from the rear of the mobility scooter;

a vertical member being elongated and attached to a second end portion of said horizontal member and disposed to project upwardly and transverse to said horizontal member; and said vertical member is configured to be positioned to project into and through an opening in the bottom of a cage basket of a retail shopping cart to permit a user to tow the retail shopping cart from the front with a mobility scooter.

2. The mobility scooter tow arrangement of claim 1, wherein:

said vertical member comprises a base portion and a securing portion configured to be detachably connected to said base portion;

said base portion is attached to said second end portion of said horizontal member in a fixed vertical position;

said base portion is configured to be positioned below an opening in the bottom of a cage basket of a retail shopping cart;

said securing portion is configured to be inserted through the opening in the bottom of a cage basket of a retail shopping cart and detachably connected to said base portion; and said securing portion is sufficiently long such that said securing portion is disposed to project through the opening in the bottom of a cage basket of a retail shopping cart and into the cage basket upon connection to said base portion.

3. The mobility scooter tow arrangement of claim 2, wherein:

said securing portion comprises a rod; and said base portion comprises a receptacle configured to receive a portion of said rod therein to detachably connect said securing portion to said base portion.

4. The mobility scooter tow arrangement of claim 3, wherein said securing portion of said vertical member comprises a securing flange of a diameter sufficient to prevent passage of said securing flange through an opening in the bottom of a cage basket of a retail shopping cart and thereby automatically adjust the height of said vertical member.

5. The mobility scooter tow arrangement of claim 4, wherein:

said horizontal member is in the form of a bar configured to be slid into or onto a tow hitch projecting from a lower rear portion of a mobility scooter;

said horizontal member comprises a pair of bar apertures configured to be aligned with a hitch passage in the tow hitch;

said locking arrangement comprises a tow pin and a semi-rigid locking structure that comprises a first end affixed to one end of said tow pin and a free second end;

said tow pin is configured to be inserted through said bar apertures and said hitch passage to detachably connect said horizontal member to the tow hitch; and said free second end is configured to be detachably connected to an opposite end of said tow pin to prevent inadvertent or unintentional displacement of said tow pin out of said horizontal member and the tow hitch.

6. The mobility scooter tow arrangement of claim 2, wherein:

said horizontal member is in the form of a bar configured to be slid into or onto a tow hitch projecting from a lower rear portion of a mobility scooter;

said horizontal member comprises a pair of bar apertures configured to be aligned with a hitch passage in the tow hitch;

said locking arrangement comprises a tow pin and a semi-rigid locking structure that comprises a first end affixed to one end of said tow pin and a free second end;

said tow pin is configured to be inserted through said bar apertures and said hitch passage to detachably connect said horizontal member to the tow hitch; and said free second end is configured to be detachably connected to an opposite end of said tow pin to prevent inadvertent or unintentional displacement of said tow pin out of said horizontal member and the tow hitch.

7. The mobility scooter tow arrangement of claim 3, wherein one of (A), (B), and (C):

(A) said rod comprises a male-threaded portion configured to screw into a female-threaded portion of said receptacle to detachably connect said securing portion to said base portion;

(B) said rod comprises a depressible projection and said receptacle comprises a plurality of locking holes into which said depressible projection can project to adjustably and detachably connect said securing portion to said base portion; and (C) said rod comprises a rod passage, said receptacle comprises a pair of receptacle apertures to be aligned with said rod passage, and said tow arrangement further comprises a locking pin configured to be inserted through said receptacle apertures and said rod passage to detachably connect said securing portion to said base portion.

8. The mobility scooter tow arrangement of claim 1, wherein:

said horizontal member comprises a pivot arrangement to pivotably connect said second end portion to said first end portion to permit downward pivoting of said second end portion from an aligned position aligned with said first end portion to an angled position at an acute angle with respect to said first end portion;

said pivot arrangement is configured to permit a user to pivot said second end portion and said vertical member attached thereto downwardly from an aligned position such that a top end of said vertical member is disposed below the bottom of a cage basket of a retail shopping cart; and said pivot arrangement is configured to permit a user to pivot said second end portion and said vertical member attached thereto upwardly from an angled position such that said top end of said vertical member is inserted through an opening in the bottom of a cage basket of a retail shopping cart.

9. The mobility scooter tow arrangement of claim 8, further comprising a handle disposed on said second end portion of said horizontal member and configured to permit a user to grasp and pivot said second end portion, which handle is angled with respect to the second end portion at an acute angle.

10. The mobility scooter tow arrangement of claim 9, wherein said pivot arrangement comprises a spring-loaded pull pin mounted in said first end portion and configured to project into said second end portion to releasably lock said second end portion in said aligned position.

11. The mobility scooter tow arrangement of claim 8, wherein said pivot arrangement comprises a spring-loaded pull pin mounted in said first end portion and configured to project into said second end portion to releasably lock said second end portion in said aligned position.

12. A method of towing a retail shopping cart using the mobility scooter tow arrangement of claim 1 comprising the steps of:

detachably connecting said first end portion of said horizontal member to the rear of a mobility scooter with said locking arrangement such that said horizontal member projects in a fixed essentially horizontal position from the rear of the mobility scooter;

positioning said vertical member to project into and through an opening in the bottom of the cage basket of the retail shopping cart; and operating the mobility scooter and towing the retail shopping cart from the front.

13. The method of claim 12, wherein said vertical member comprises a base portion and a securing portion configured to be detachably connected to said base portion, and said step of positioning said vertical member comprises:

positioning said base portion below the opening in the bottom of the cage basket of the retail shopping cart; and inserting said securing portion downwardly through the opening in the bottom of the cage basket of the retail shopping cart and detachably connecting said securing portion to said base portion such that said securing portion is disposed to project through the opening and into the cage basket.

14. The method of claim 13, wherein said step of positioning said base portion comprises positioning said base portion below the opening that is closest to the front end of the cage basket.

15. The method of claim 12, wherein said horizontal member comprises a pivot arrangement to pivotably connect said second end portion to said first end portion, and said step of positioning said vertical member comprises:

downwardly pivoting said second end portion from an aligned position aligned with said first end portion to an angled position at an acute angle with respect to said first end portion such that a top end of said vertical member is disposed below the bottom of a cage basket of a retail shopping cart; and upwardly pivoting said second end portion from said angled position to said aligned position such that said top end of said vertical member is inserted through an opening in the bottom of the cage basket of the retail shopping cart.

\* \* \* \* \*